M. BODENSTEIN.
TIRE CHAIN ATTACHMENT.
APPLICATION FILED MAR. 5, 1914.
1,123,076. Patented Dec. 29, 1914.
2 SHEETS—SHEET 1.
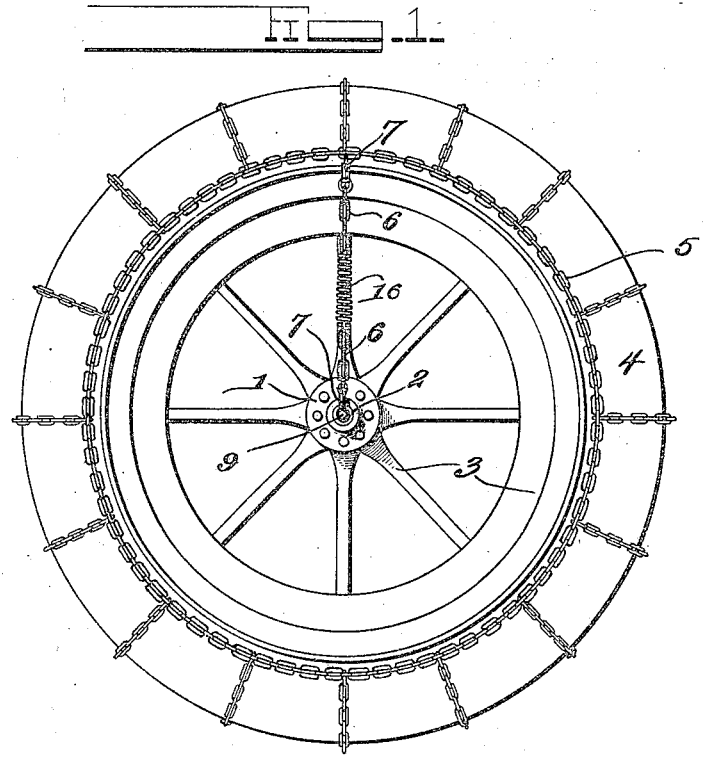
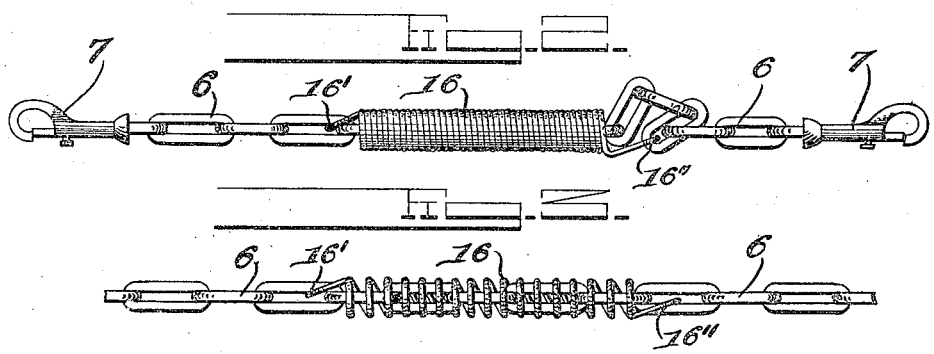
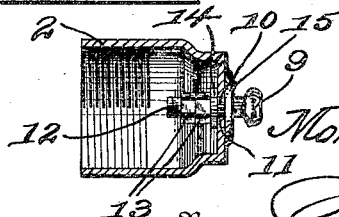
Inventor
Morgan Bodenstein.
Witnesses
By
Attorney

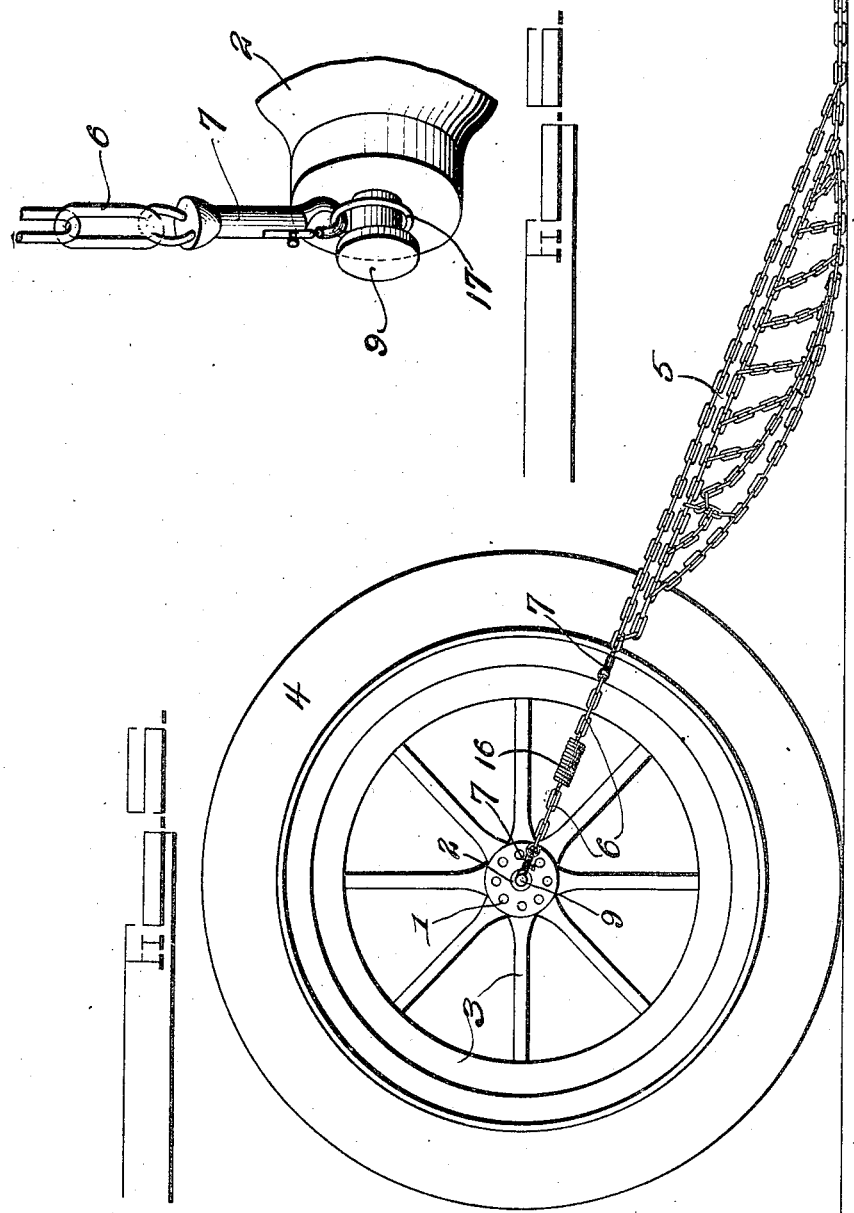

UNITED STATES PATENT OFFICE.

MORGAN BODENSTEIN, OF ROCHESTER, NEW YORK.

TIRE-CHAIN ATTACHMENT.

1,123,076.

Specification of Letters Patent.

Patented Dec. 29, 1914.

Application filed March 5, 1914. Serial No. 822,615.

*To all whom it may concern:*

Be it known that I, MORGAN BODENSTEIN, a citizen of the United States, residing at Rochester, in the county of Monroe and State of New York, have invented certain new and useful Improvements in Tire-Chain Attachments, of which the following is a specification.

My invention relates to improvements in tire chain attachments and refers particularly to an attachment for the usual antiskid tire chain, which will prevent the antiskid chain from being lost if for any reason it should be cast or thrown from the wheel.

The main object of my invention is the provision of an attachment which can be instantly applied to the non-skid chain and a button fastened to the hub cap, or any device that is fastened to the center part of wheel which is free to move about a center and which will not interfere in the least with the proper function of the skid chain, but will prevent a chain from being lost in that, when the non-skid is cast or thrown from the wheel, my chain attachment drags the non skid chain on the ground.

Another object of my invention is the provision of an attachment of the character and for the purpose stated which can be produced at a very low cost, which will be compact and small in size to occupy a small space, which will be strong and durable of ornamental appearance and from every point of view be thoroughly efficient and practical.

The broad idea of my invention is to provide an attachment that is fastened to the center part of a wheel and to the non-skid chain in such a manner as not to interfere with the proper function of the non skid chain and to drag the chain along the ground in such a way that it cannot wind up about the hub. Any swivel attachment at the hub will prevent its winding about the hub.

With these objects in view my invention consists in the combination with the hub and non skid chain of an attachment having an elastic section with one end connected to a band which is fastened to revolve about the hub or a button fastened to the hub cap.

The invention further consists of a tire chain attachment embodying novel features of construction and combination of parts substantially as disclosed herein.

In order that the manner of using and the construction in detail as well as the many advantages of my attachments may be fully understood and appreciated, I have shown in the accompanying drawings an attachment constructed according to my invention.

Figure 1 represents a side elevation of an automobile wheel showing the tire chain and my attachment applied thereto. Figs. 2 and 3 represent side elevations of my attachment removed from the wheel and chain and shown on an enlarged scale. Fig. 4 represents a sectional view of the hub cap with the means attached thereto for connection with one of the fasteners of my attachment. Fig. 5 represents a side elevation of a wheel showing the position of my attachment when holding the tire chain after it has been detached from the wheel, and Fig. 6 represents a perspective view of a modified form of connection between the hub caps and my attachment.

In the drawings: The numeral 1 designates the hub, 2 the hub cap, 3 the wheel, 4 the tire and 5 the anti-skid chain, which is of well-known or any preferred construction and in connection with which my attachment is used.

The attachment if of extremely simple construction and consists of a chain 6, to each end link of which is connected a fastener 7, one of the fasteners being connected at 8 to a link of the chain on the tire, and the other fastener 7, being engaged upon the button or headed stud 9, formed on the stem 10, passing through the opening 11 of the hub cap, having a threaded inner end 12, engaged by the clamping nuts 13, and having upon one side the collar 14 bearing against the inner face of the hub cap, and formed upon its outer portion with a flange 15, bearing against the outer face of the said hub cap. If desired, I may use the ring 17 as shown in Fig. 6.

The construction brings the stud or button or ring in line with the tire chain and disposes the chain of the attachment in proper relation between the tire chain and the hub cap, and in order to retain the chain attachment in taut condition, also make my attachment adjustable to fit any size wheel, also make the attachment neat in appearance and still permit the proper action or movement of said chain, I place around the chain the coil spring 16, which has one end 16' connected to a link of the chain and its other hooked end 16", connected to another link of the chain, the tension of the spring thus pulling upon the links of the chains and causing the chain to remain taut.

It will be observed that the snap fasteners upon the ends of the chain permit of the instant application of the chain forming the attachment to the tire chain and hub or the instant removal when desired and also the snap fastener which is connected to the stud on the hub cap or ring allows the rotation of my attachment without the least interference.

It will be noted that my attachment will accommodate itself to conditions, also that it is of strong and durable construction, inexpensive of production and in every particular thoroughly efficient and practicable.

I claim:—

1. In a tire chain attachment, the combination with the hub and the tire chain, of a single chain having one of its ends connected freely to the hub and its other end connected fixedly to the tire chain, and a spring carried by said chain to make it adjustable to fit any size wheel, and to retain the links in taut condition.

2. In a tire chain attachment, the combination with the hub and the tire chain, of a single chain having snap fasteners at its ends for engaging the tire chain and hub, and a spring carried by said chain to make it adjustable to fit any size wheel, and to retain its links in taut condition, the connection with the hub allowing free revolution of the hub.

3. In a tire chain attachment, the combination with the hub and the tire chain, a headed stud mounted in the hub, and a chain having one end connected to the tire chain and its other end connected to said headed stud, and allowing the stud to revolve freely.

4. In a tire chain attachment, the combination with the hub and the tire chain, of a chain providing an attachment between the tire chain and hub, and snap fasteners connected to the ends of said chain for securing the chain to the tire chain and hub, one connection being fixed and the other allowing the hub to revolve in said connection.

In testimony whereof I affix my signature in presence of two witnesses.

MORGAN BODENSTEIN.

Witnesses:
 IRVING BODENSTEIN,
 GUSSIE LARKIN.

Copies of this patent may be obtained for five cents each, by addressing the "Commissioner of Patents, Washington, D. C."